UNITED STATES PATENT OFFICE.

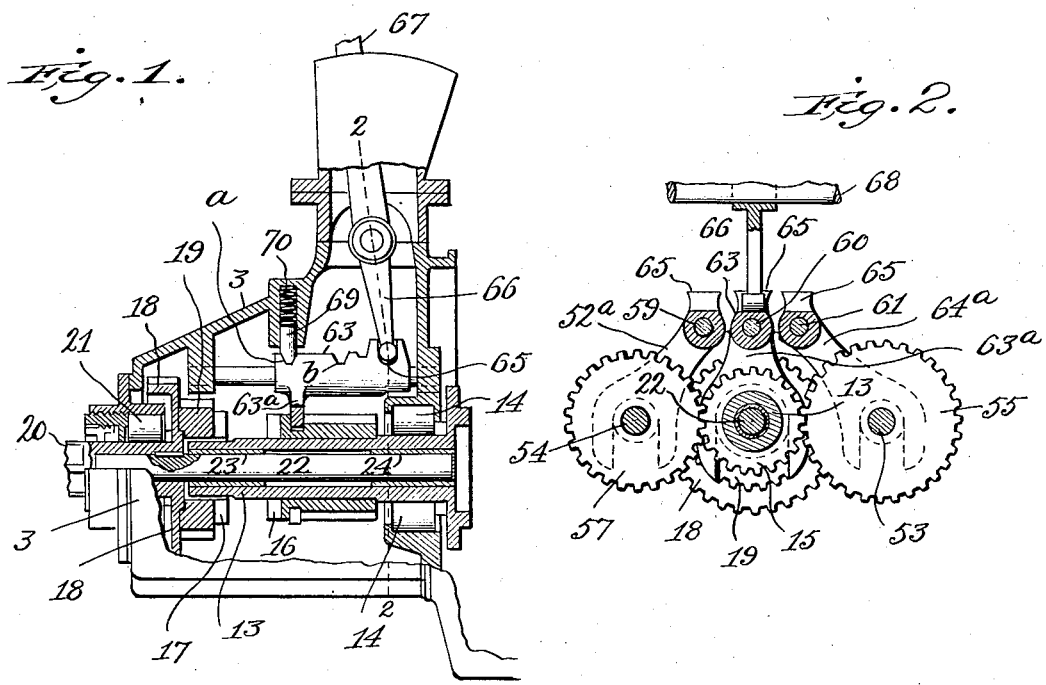
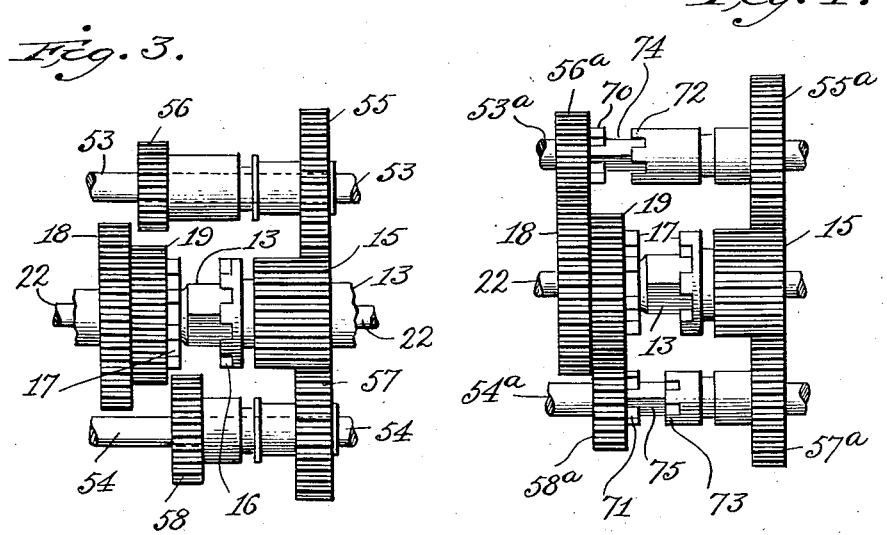

GEORGE D. MUNSING, OF NEW YORK, N. Y.

SPEED-CHANGING MECHANISM.

1,064,365.

Specification of Letters Patent.

Patented June 10, 1913.

Original application filed May 17, 1911, Serial No. 627,864. Divided and this application filed July 27, 1912. Serial No. 711,898.

*To all whom it may concern:*

Be it known that I, GEORGE D. MUNSING, a citizen of the United States of America, residing at New York city, in the county and State of New York, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to change speed mechanism, and has for its object to provide a simple, efficient and reliable operating mechanism of this type adapted to change the speed of any driven member by means of sliding gears, and is more particularly adapted for motor vehicles.

The present application is a division of my application Serial No. 627,864, filed May 17, 1911.

Referring to the drawings, in which like parts are similarly designated—Figure 1 is a vertical, longitudinal, central section of the speed changing mechanism embodying my invention. Fig. 2 is a section on line 2—2 of Fig. 1. Fig. 3 is a plan view of the sliding gears. Fig. 4 is a view similar to Fig. 3, showing a modification.

Referring more particularly to the drawing, 3 designates a portion of the gear-casing in which the driving shaft 13 is journaled in suitable roller bearings 14 in said casing. This shaft is designed to be connected up to the shaft (not shown) of a prime motor through a friction gear and reversing mechanism such as shown and described in my above named application.

On driving shaft 13 is slidably, but not rotatably, mounted a long pinion 15, having a clutch face 16 which is capable of engaging a clutch face 17 on a double gear 18—19, secured to the driven shaft 20. This driven shaft 20 is mounted in a roller bearing 21 in the casing 3 and has an internal bore in which is fixed a short shaft 22 which extends within the driving shaft 13 and is supported therein by bushings 23, 24.

Parallel with the shaft 13 are two preferably round shafts 53 and 54, Fig. 3, rotatable in bearings in the casing 3. Mounted free to rotate and also free to slide on shaft 53 are a pair of connected gears 55 and 56. The gear 55 is capable of meshing with the pinion 15, and the gear 56 is capable of meshing with the gear 18 of the double gear 18—19.

Mounted on shaft 54 so as to be both rotatable and slidable thereon is a pair of connected gear wheels 57 and 58. The gear 57 is capable of meshing with the pinion 15 and the gear 58 is capable of meshing with the gear wheel 19 of the double gear 18—19. Above the shaft 53—54 and shaft 13 are shafts 59, 60 and 61, Figs. 1 and 2. On each of these shafts are mounted slidable sleeves 62, 63 and 64, the sleeve 62 having a fork 62$^a$ engaging the pair of gears 57—58, the sleeve 63 having a fork 63$^a$ engaging the pinion 15 and the sleeve 64 having a fork 64$^a$ engaging the gear wheels 55—56. In order to slide these wheels axially each sleeve is provided with an operating notch 65 into which is capable of being moved, the lower end 66 of an operating lever 67 pivoted at 68. This operating lever is loose on its pivot 68 and is slidable laterally thereon so as to be moved into engagement with the sleeves 62, 63 and 64. Each sleeve 62, 63 and 64 has two notches $a$, $b$, adapted to be engaged by pins 69, urged by springs 70. There is one of these pins and springs for each sleeve so that when the sleeves are moved to position, shown in Fig. 1 and the pins engage notches $a$ all the gears are in disengaged or inoperative position. By moving the lever 67 to move any one of the sleeves 62, 63 or 64 so that the pins 69 will enter notches $b$, anyone of the gears may be thrown into operation.

The operation of the device is as follows: With the parts in the position shown in Fig. 1, the gear wheels 55 and 57 are driven from the pinion 15 so that the gear wheels 55, 56, 57 and 58 rotate idly. By moving the lever 67 forward to the extreme limit the pin 69, Fig. 1 will enter notch $b$, and the pinion 15, which rotates in unison with the driving shaft, is shifted causing the clutch face 16 to engage clutch face 17. The shifting of the pinion 15 moves it out of gear with the gear wheels 55 and 57 and the engagement of the clutch faces causes the double gear 18—19 to rotate at engine speed while the gear wheels 55, 56, 57 and 58 remain stationary. Returning pinion 15 to the position shown in Fig. 1 and laterally shifting lever 67 either to the right or left, either of the pairs of pinions 55—56 or 57—58 may be moved into action. When gear wheels 55 and 56 are moved by lever 67, the gear wheel 56 meshes with gear 18 and we have low speed. If, on the other hand gear wheels 57 and 58 be moved into action the gear wheel 58 meshes with the gear wheel 19 and we have medium speed.

It will be observed that by reason of the recesses 65 being in alinement it will be necessary to return lever 67 always to the position shown in Fig. 1 before laterally moving said lever to shift to another speed. For the proper operation of the change speed mechanism it is necessary or desirable when shifting pinion 15 to position shown in Fig. 1 that it comes into mesh, first with one and then with the other of the two gears 55—57, in other words, one of the gears 55—57 should lead in meshing with the pinion 15. This may be done either by setting one of the gears 55—57 in advance of the other or as I have shown in Fig. 3 by making gear wheel 57 with a little wider face than the gear wheel 55 so that when the pinion 15 is brought back to the position Fig. 1, after being on high speed it will catch one of the gear wheels, say, 57 before it engages with the other gear wheel 55.

In Fig. 4 I have shown a modified arrangement of the sliding gears in which I have shown the gear wheels 56ª and 58ª as permanently in mesh with the gear wheels 18 and 19 respectively. These wheels are free to rotate on their shafts, as well as the shafts themselves being free to rotate in the casing. In this modified form there is no sleeve connecting the pairs of shifting gear wheels, and in lieu thereof the gear wheels 56ª and 58ª are provided with clutch faces 70 and 71 respectively, while the gear wheels 55ª and 57ª are provided with complementary clutch members 72 and 73. That portion of the shafts 53ª and 54ª on which gear wheels 55ª and 57ª slide is made square as shown at 74 and 75, so that when either of the gear wheels 55ª or 57ª (which are continuously rotated by pinion 15) are moved to cause their clutches to engage, they will not rotate upon their shafts.

I claim:

1. A speed change mechanism comprising a driving member, a pinion slidable thereon, a driven shaft, a double gear wheel on the latter, shafts parallel to the pinion, a gear wheel on each parallel shaft to mesh with the double gear, and a second gear wheel on each parallel shaft from which the first gear wheel thereon is driven and in constant mesh with and slidable longitudinally of the pinion.

2. A speed change mechanism comprising a driving member, a pinion having a clutch face and slidable, but not rotatable on the driving member, a driven shaft, a double gear thereon, shafts parallel to the pinion, a pair of gears slidable on the parallel shafts, one gear of each pair capable of meshing with the double gear and the other capable of meshing with the pinion and a slide to actuate each of the pairs of gears and the pinion.

3. A speed change mechanism comprising a driving member, a pinion having a clutch face and slidable, but not rotatable on the driving member, a driven shaft, a double gear thereon, shafts parallel to the pinion, a pair of gears slidable on the parallel shafts, one gear of each pair capable of meshing with the double gear and the other capable of meshing with the pinion, a slide to actuate each of the pairs of gears and the pinion, a latch for each slide, and a lever to actuate the slide.

4. A speed change mechanism comprising a driving shaft, a pinion having a clutch face and slidable but not rotatable on the shaft, a driven shaft, a double gear thereon, shafts parallel to the pinion, a pair of gears slidable on the parallel shafts, one gear of each pair capable of meshing with the double gear and the other capable of meshing with the pinion, a slide to actuate each of the pairs of gears and the pinion, said slides having recesses in normal alinement, a latch for each slide, and a lever movable transversely of the slides and adapted to engage the recesses to actuate the slides.

5. A speed change mechanism comprising a driving shaft, a pinion having a clutch face and slidable, but not rotatable on the shaft, a driven shaft, a double gear thereon having a clutch face to engage the face of the pinion, shafts parallel to the driving shafts, a pair of gears slidable on the parallel shafts, one gear of each pair capable of meshing with the double gear, the other gear of each pair capable of meshing with the pinion, one of the last named gears arranged to mesh with said pinion in advance of the other when they are moved into engagement with the pinion, and a slide to actuate each of the pairs of gears and the pinion.

In testimony that I claim the foregoing as my invention, I have signed my name in presence of two subscribing witnesses.

GEORGE D. MUNSING.

Witnesses:
 HENRY ORTH, Jr.,
 H. P. HOWARD, Jr.